Figure 1:
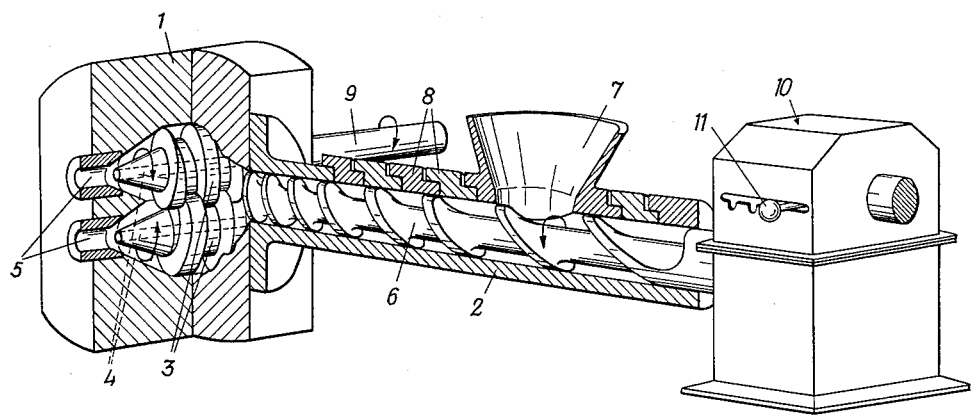

United States Patent Office 3,019,484
Patented Feb. 6, 1962

3,019,484
APPARATUS FOR APPLYING A COATING ON WELDING ELECTRODE MATERIAL
Harald Strohmeier, Kapfenberg, Styria, Austria, assignor to Gebr. Bohler & Co. Aktiengesellschaft, Vienna, Austria
Filed June 16, 1959, Ser. No. 820,733
Claims priority, application Germany June 19, 1958
1 Claim. (Cl. 18—12)

This invention relates to coated electrodes for arc welding, more particularly for an improved apparatus of applying a coating on welding electrode material.

After the coating composition has been applied to the core wire, the electrodes are subjected to a drying process. For this purpose the rods are air-dried first and are then completely dried in a drying oven. The drying operation takes many hours and a large space is required for stacking the continuously supplied rods. It has been attempted to shorten the drying time. With this object in mind it has been proposed to heat the coating composition by resistance or induction heating of the core wire. It has also been proposed to subject the coating composition to infrared radiation. All these processes have the disadvantage that the outermost layer of the coating composition dries and hardens before the inner layers of the composition and the subsequent drying of the inner layers causes a formation of contraction cracks in the outermost layers; these cracks are the reason for defective seam welds.

Tunnel ovens have been used for drying. In these ovens the rods pass first through chambers filled with air which is highly saturated with water vapor in order to ensure that the coating composition will dry from the inside to the outside.

A hot extrusion process for the coating composition for the welding wires is known, which composition contains a thermoplastic binder in order to ensure that it is plastic while being extruded. These coatings harden as the composition cools. In connection with electrodes which have a coating composition containing a binder like water-glass it has also been proposed to apply the composition in hot condition on the core wire. The coating coming out of the extruder in a warm condition delivers its moisture within very short time and is ready for use in welding. The drying time required in this process is extremely short.

The application of this process to the large-scale continuous manufacture of coated electrodes involves very great difficulties because in the conventional hydraulic extruders for applying the coating composition the mixed composition is extruded out of a cylinder. The heating of the composition in this cylinder is not practicable because the coating composition is a poor conductor of heat so that a uniform soaking of the composition in the cylinder itself is not possible. For this reason it is necessary to heat the coating composition, as in laboratory tests, in a separate vessel outside the extruder, e.g., during the mixing of the ingredients of the composition, until it has reached the desired temperature. This procedure has the disadvantage that the liquid evaporates from some parts of the composition through various leaks as the composition is transferred from the mixing vessel into the extrusion cylinder. As a result, these parts of the composition harden, which causes defects in the coating of the electrode. In order to avoid this, an appropriately large amount of liquid has been added to the composition during the mixing operation and a sufficiently large part of this liquid evaporates until the desired temperature has been reached so that the composition has just the desired moisture content at the time of extrusion.

It has been found, however, that the addition of a substantial amount of water in excess of that required for the setting of the extruded composition adversely affects the extrusion behavior of the electrodes even if the liquid is subsequently removed from the composition. If the composition is contacted by air while being kneaded or extruded, the extrusion behavior will be adversely affected even if the composition does not harden. It is believed that this disadvantage is due to a premature setting of the water-glass so that the composition has a poor plasticity.

The previously known apparatus enable a mixing and extruding of the coating composition in the absence of air only if highly complicated modes of operation are strictly adhered to. These modes of operation are not suitable for continuous industrial manufacture.

The invention relates to an apparatus for applying a coating on welding electrode material, in which apparatus the core wire is preferably heated by any of the known methods before or after the coating has been applied thereto by extrusion, and which provides electrodes having an extruded coating which can be dried quickly and substantially without supply of external heat thereto. The process comprises extruding a coating composition as a coating on a core, previously working said composition in the absence of air by a feed screw unit to raise the temperature of said composition by friction sufficiently to cause it to be extruded at a temperature of 40–100° C., and drying said coating on said core substantially without supply of heat thereto from the outside.

The premixed composition or its individual constituents are introduced into the chamber of the precompacting screw unit, which is provided with one or several feed screws. In this chamber the composition is kneaded until the desired temperature has been reached as a result of the friction between the several particles. The extruder is connected to the screw chamber and the composition which has been mixed and has been heated by friction is continuously or intermittently fed by the feed screws into the extruder, which extrudes the coating composition on the rods passing through.

The kneading operation in the screw chamber results in a temperature gradient which is such that the warmer layer is near the extruder. The next layer is less heated and shields the hotter layer against the outside temperature. The temperature of the layers increases with the thickness of the layers. Likewise, the heat insulation of the layers against the outside air increases with their thickness owing to the low thermal conductivity of the composition.

The sealing effected by the several layers does not only prevent a loss of heat but also an escape of the liquid so that the composition is heat-insulated and increasingly protected against an evaporation of the liquid.

While the composition is being kneaded and compressed in the screw chamber it is also vented under pressure. The air occluded between the particles of the composition is expelled. This results in a higher density of the composition and in improved welding characteristics of the electrode.

The amount of moisture admixed to the composition with the water-glass is preferably only sufficient to ensure an adequate plasticity of the composition during the extrusion and the subsequent setting thereof. By experience, the plasticity of the composition increases with temperature. The rate at which the plasticity increases with temperature is so high that a composition which is cold and can hardly be worked before being heated will assume a pulpy consistency when heated. The reduction of the work required for plastification and the increase in plasticity increase with temperature. After the highest plasticity has been reached, however, a further temperature rise will cause a sudden increase in the work required for plastification. For this reason less liquid is required in a composition which is heated to the temperature where it has the highest plasticity.

A composition heated to this temperature can be given the plasticity required for extrusion with the smallest amount of work. At the same time the drying time is reduced owing to the lower moisture content of the composition and because the composition is in a hot condition so that the moisture evaporates quickly after the extrusion.

In order to maintain the composition at the optimum temperature in the extruder under various atmospheric pressures and atmospheric temperatures a fairly exact regulation of the friction work in the screw chamber must be provided for. This can be obtained by arranging for an exact regulation of the speed of the feed screw. The friction work may also be varied by varying the point where the composition is fed to the screw chamber so that the composition moves along a larger or smaller part of the feed screw. To this end the screw chamber may be so constructed that the composition must move for an adjustable distance along the precompacting screw in dependence on the variable position of the inlet means in accordance with the desired temperature of the composition.

In the case of coating compositions which show only a slight variation in properties during setting, drying and, above all, welding, the work required for plastification may be varied by a variation of the amount of liquid added to the composition.

To maintain a continuous extrusion and in order to eliminate the need for a reduction of the extrusion rate when the heat of friction in the precompacting screw or in the extruder rises above the predetermined value, a cooling device may be provided at appropriate parts of the machine, e.g., at the feed screw or at the extruder itself.

The rods coming out of the extruder and having coatings which are not too thick will dry within one to two minutes to a condition in which they are ready for welding and shipping. In the case of rods having a thicker coating the outermost layer of the coating may dry before the inner layers. This may cause cracks to form in the coating in spite of the process according to the invention. In order to avoid this, the rods coming from the press are received by a conveyor which is insulated from the outside air by a shield holding an atmosphere of higher humidity. This inhibits the drying of the surface portions of the coating as it travels through this space whereas the drying of the inner layers is not substantially retarded so that a uniform drying throughout the cross-section may begin immediately after the rods have emerged from this space. This enables even rods having a thick coating to be dried within a short time without cracks being formed in the coating.

In a continuous process the composition heated in a screw chamber is directly fed to a helix-type machine for extruding the coating on the core wires. Alternatively any other extruder may be used in conjunction with the screw chamber serving to heat the composition.

The drying time of the coated rods may be shortened by heating the core wire by a known method, e.g., by resistance heating, after it has emerged from the extruder. It is of special advantage to feed the core wires to the coating press immediately after they have been drawn, straightened and cut so that the temperature increase of the core wire due to the preceding operations is utilized for reducing the drying time.

Rods which are usually subjected to roasting, e.g., those having a calcium-base coating, must undergo this roasting treatment after the process described.

Figure 2:
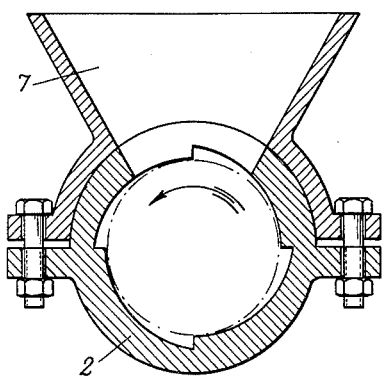

The invention will now be explained with reference to an illustrative embodiment which is shown on the accompanying drawing, in which:

FIG. 1 is a sectional view showing a helix-type extruder for carrying out the process and FIG. 2 is a transverse sectional view taken through the feed screw of the extruder.

The housing of the precompacting screw adjoins the housing 1 of the high-pressure screws. The high-pressure screws 3 have intermeshing screw threads. Each of the high-pressure screws has a central bore 4, which extends along the axis of the screw. The core wires are continuously fed through these bores during the extrusion process. An annular orifice 5 is disposed in front of each of the high pressure screws and spaced therefrom.

The axis of the precompacting screw is approximately at right angles to the axes of the high-pressure screws. The shell of this feed screw 6 is provided with a feed hopper 7 for feeding the coating composition. This feed hopper may be disposed at a selected distance from the high-pressure screws. To vary the position of the feed hopper the shell of the feed screw comprises several segments 8, any of which can be replaced by the feed hopper.

At the beginning of the coating process the coating composition is introduced through the feed hopper into the feed screw unit and rotation is imparted to the feed screw. The high-pressure screws are not moved until the working of the coating composition by the pre-compacting screws has imparted to the composition that temperature which has been found suitable for the extruding and quick drying thereof. When the coating composition has reached the required temperature the rotation of the high-pressure screws is started and core wires are continuously fed through the feed duct 9 to the bores 4 and the orifices 5. Coated electrodes will then emerge from the orifice just at that temperature, of 40–100° C., which ensures a quick drying of the coating composition without injury thereof.

Once the desired temperature of the composition has been reached the feeding of the composition may be continuous without causing the temperature of the composition to drop below the required value in continuous operation if the speed of rotation of the precompacting screw, which is adjustable by means of the infinitely variable transmission 10 provided for driving the feed screw and having an adjusting handle 11, and the distance from the feed hopper to the high-pressure screws are selected to provide for an adequate amount of friction between the particles of the composition.

What is claimed is:

Apparatus for applying a coating on welding electrode material, which comprises an extruder for extruding a coating composition as a coating on a core, a feed screw unit operable to feed said coating composition to said extruder and to work said coating composition to raise its temperature by friction sufficiently to enable it to be extruded by said extruder at a temperature of 40–100° C., and inlet means for introducing said composition to said feed screw unit, said feed screw unit being constructed to have said inlet means detachably connected to any of several points of the length of said feed screw unit.

References Cited in the file of this patent

UNITED STATES PATENTS

| | | |
|---|---|---|
| 2,257,104 | Burrows et al. | Sept. 30, 1941 |
| 2,332,538 | Smith | Oct. 26, 1943 |
| 2,604,659 | Eppler | July 29, 1952 |
| 2,740,988 | Henning | Apr. 10, 1956 |
| 2,947,030 | Varn | Aug. 2, 1960 |

FOREIGN PATENTS

| | | |
|---|---|---|
| 901,347 | France | Oct. 30, 1944 |